Dec. 30, 1958   C. M. MOORE ET AL   2,866,936
RINGLESS CLOSURE FOR SOCKET METER ENCLOSURE
Filed March 7, 1956   2 Sheets-Sheet 1
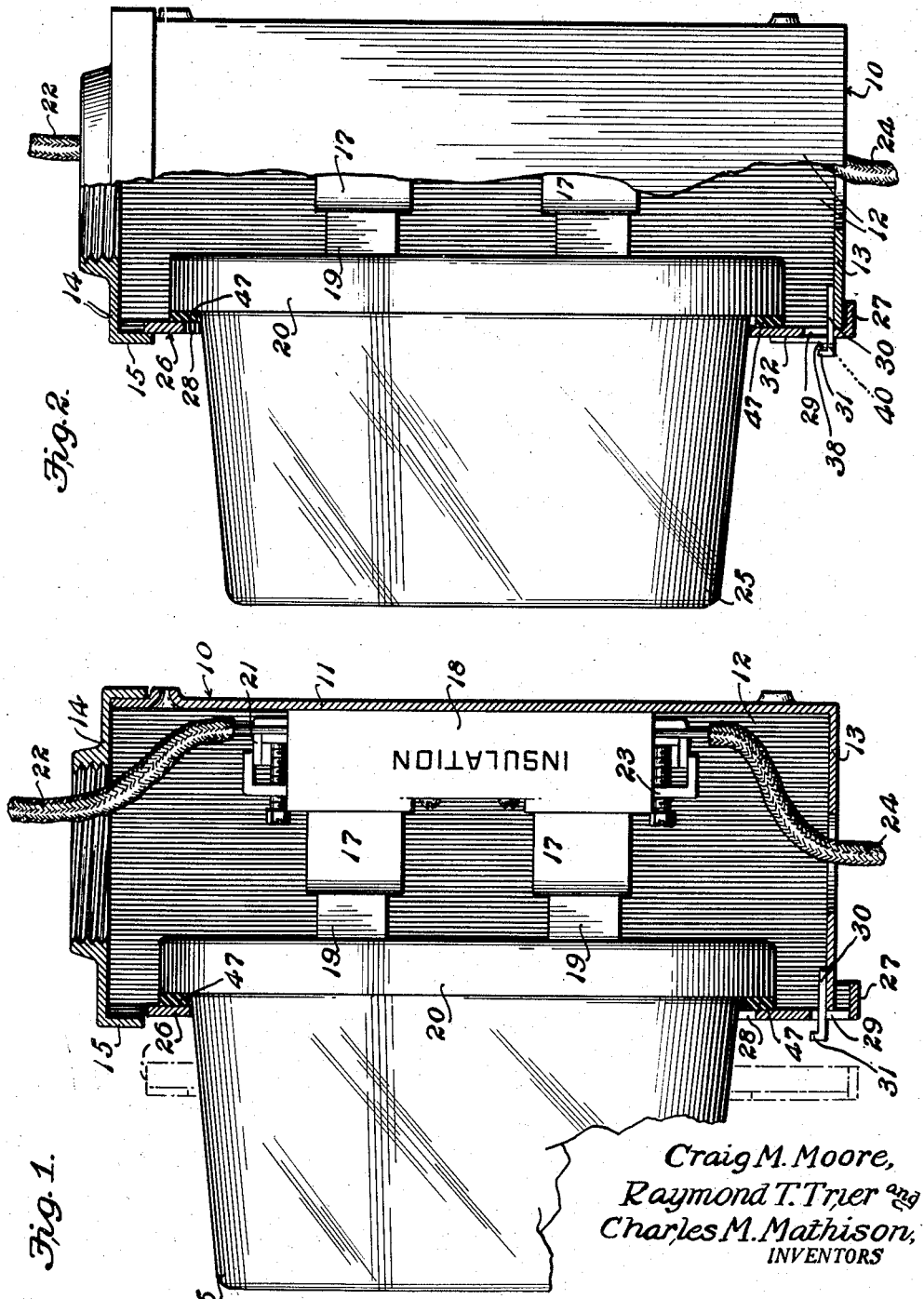
Craig M. Moore,
Raymond T. Trier and
Charles M. Mathison,
INVENTORS
BY
Frease & Bishop Dec. 30, 1958     C. M. MOORE ET AL     2,866,936
RINGLESS CLOSURE FOR SOCKET METER ENCLOSURE
Filed March 7, 1956     2 Sheets-Sheet 2
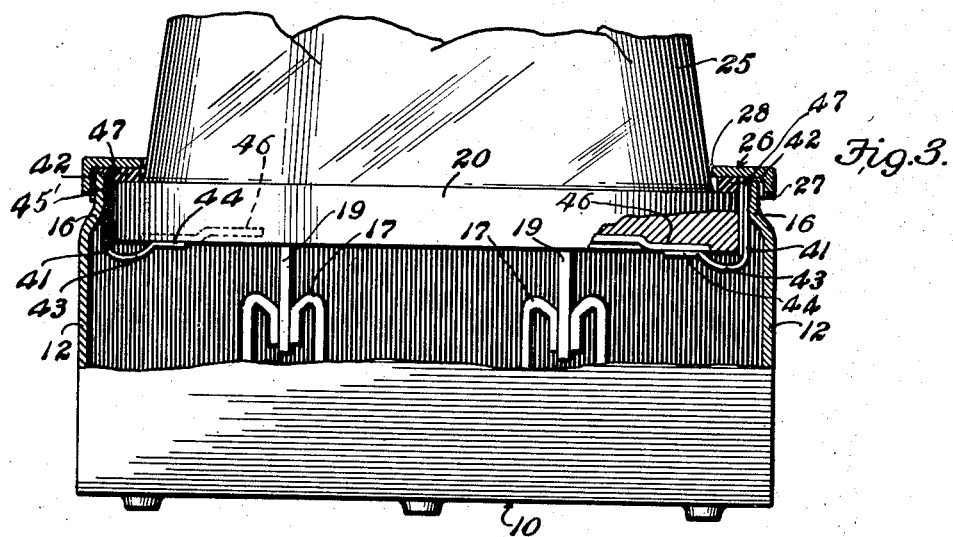
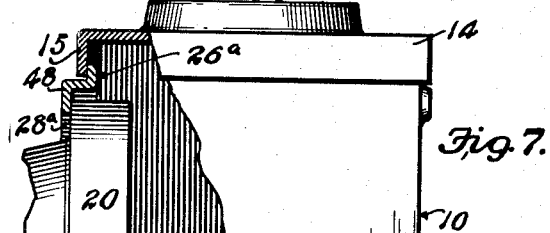
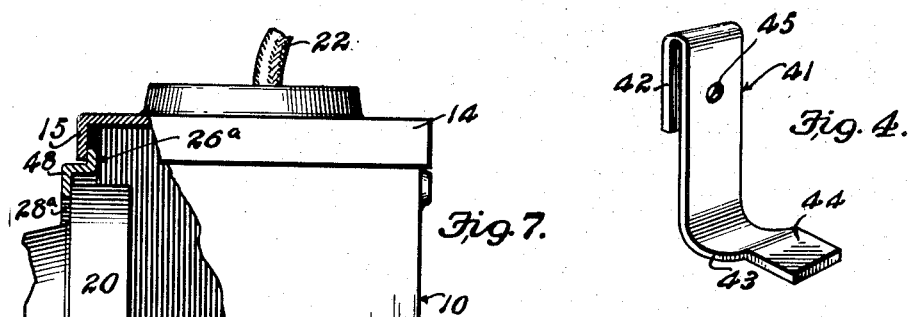
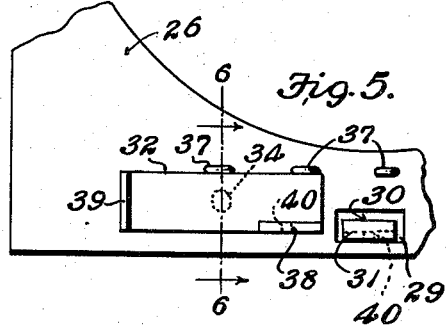
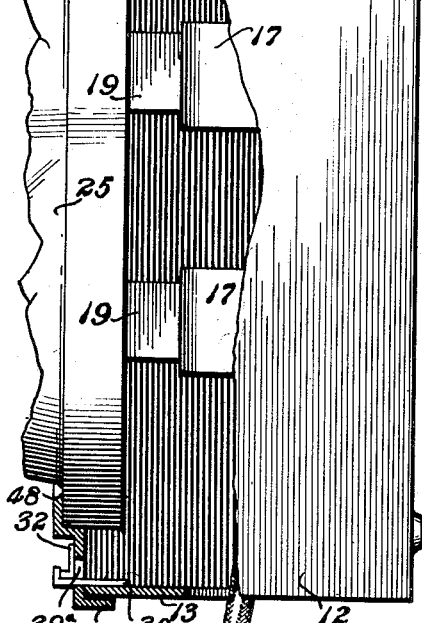
Craig M. Moore,
Raymond T. Trier and
Charles M. Mathison,
INVENTORS
BY
Frease & Bishop

United States Patent Office

2,866,936
Patented Dec. 30, 1958

2,866,936

RINGLESS CLOSURE FOR SOCKET METER ENCLOSURE

Craig M. Moore and Raymond T. Trier, North Canton, and Charles M. Mathison, Canton, Ohio, assignors to The Superior Switchboard & Devices Company, Canton, Ohio, a corporation of Ohio Application March 7, 1956, Serial No. 570,110

6 Claims. (Cl. 324—110)

The invention relates to closures or covers for socket type meter enclosures or boxes, and more particularly to a ringless closure or cover for such meter boxes.

Socket type meter enclosures, such as are now in general use, comprise generally a metal box having terminal jaws therein for receiving the terminal posts or blades of a socket type meter, and a detachable closure or cover for the box, having a circular opening therein for mounting the meter.

Under present practice, such closures or covers are usually provided with an integral flanged ring surrounding this opening, the base of the meter seating upon said flanged ring. A split sealing ring of channel cross section is provided for securing the base of the meter to this flanged ring and providing a water-tight seal between the meter and the box.

Such a construction necessitates the removal of the meter from the socket before the cover or closure can be removed from the box. This requires first unclamping and removing the sealing ring in order that the meter may be removed from the socket.

The present invention contemplates the provision of a ringless closure or cover for socket meter boxes, which eliminates the usual sealing ring, and in which the cover is placed upon or removed from the box while the meter is mounted in the socket. This cover is provided with a ringless opening of sufficient size to receive the meter case, and is adapted to contact the meter base and form a water-tight seal therewith.

Therefore, an object of the invention is to provide a ringless closure or cover for socket type meter enclosures.

Another object is to provide such a closure which eliminates the necessity of a sealing ring for attaching the meter base to the closure.

A further object is to provide a ringless closure of the character referred to which provides a water-tight seal with the meter base.

A still further object is to provide a closure of this type which may be removed from the box without disconnecting and removing the meter from the socket.

It is also an object of the invention to provide such a closure or cover having a ringless opening slightly larger than the usual glass casing of the meter, whereby the cover may be slipped over the meter casing and moved into contact with the box, and then slidably moved upward to engage the upper edge of the cover under the usual overhanging flange at the top of the box.

Another object is to provide a closure of the character referred to in which an overhanging annular flange surrounds the opening in the cover and is adapted to surround and overlay the meter base to form a water-tight seal therewith.

A further object is to provide surge clips in the box for contact with the usual surge links in the base of the meter, for grounding the meter in case of line surges caused by lightning.

A still further object is to provide a novel latching device for locking the cover upon the box, which permits the cover to be placed flat against the open outer side of the box, and then slidably moved upward thereon.

The above objects together with others which will be apparent from the drawings and following description, or which may be later referred to, may be attained by constructing the improved ringless closure for socket type meter enclosures in the manner illustrated in the accompanying drawings and hereinafter described in detail.

The invention may be briefly described in general terms as comprising, in combination with a socket type meter box having an overhanging flange at its upper end, a closure or cover comprising a flat metal sheet having an opening therein slightly larger than the usual glass casing of the meter. This opening is preferably slightly elliptical, although it may be circular and of slightly larger diameter than the meter casing.

In either event, the opening is of such size it permits the cover to be placed over the meter casing and against the open outer side of the box, and to then be slidably moved upward to engage the upper edge of the cover beneath the overhanging flange of the box, while maintaining a sealing contact with the outer surface of the base of the meter.

Latch means is provided, which preferably includes an outwardly extending keeper member at the lower end of the box and a slidably mounted bolt member upon the cover for engaging under said keeper, the cover having an aperture near its lower end, of sufficient size to receive said keeper and permit the upward sliding movement of the cover.

Surge clips are detachably mounted upon the edge portions of the side walls of the box and extend into the box in position to contact the usual surge links or arms in the base of the meter, for grounding the meter in case of line surges caused by lightning.

A modified embodiment of the invention includes an overhanging, outwardly offset annular flange surrounding the opening in the cover and arranged to surround the base of the meter and to contact the outer surface thereof to form a water-tight seal therebetween. In this embodiment of the invention, the opening is slightly larger than the base of the meter.

Having briefly described the invention, reference is now made to the accompanying drawings showing preferred embodiments thereof, in which:

Fig. 1 is a longitudinal sectional view through a socket type meter box with meter mounted therein, showing the improved ringless closure or cover located flat against the open side of the box in position to be slidably moved upward therein, and showing in broken lines the manner in which the cover is placed over the meter casing and moved toward the box;

Fig. 2 is a view similar to Fig. 1, showing the ringless cover in the closed and locked position;

Fig. 3 is a transverse sectional view, showing the surge clips upon the box contacting the surge links in the meter base;

Fig. 4 is a detached perspective view of one of the surge clips;

Fig. 5 is a fragmentary elevation of a part of the lower portion of the cover, showing the latch means for securing the cover to the box;

Fig. 6 is a section taken on line 6—6, Fig. 5; and

Fig. 7 is a longitudinal sectional elevation showing a modified form of the invention.

Referring now more particularly to the construction illustrated in the accompanying drawings, in which similar numerals refer to similar parts throughout, a conventional socket type meter enclosure is shown in the form of a sheet metal box indicated generally at 10.

This box includes the back wall 11, side walls 12, bottom wall 13, and top wall 14 having the overhanging flange 15 at the open front side of the box. The side walls 12 of the box are preferably inwardly offset at their forward edges, as indicated at 16, in accordance with usual practice in such boxes.

As is customary in socket meter type boxes, terminal jaws 17 are mounted upon insulation blocks 18, located within the box and positioned to receive the terminal blades or posts 19, which project rearwardly from the base 20 of the conventional socket type meter.

The two upper terminal jaws 17 are provided with line wire connections 21 to which the line wires 22 are connected, and the two lower terminal jaws 17 are connected, by load wire connections 23 to the customer's load wires 24, as in customary practice. A glass case 25 encloses the usual watt-hour meter, and is attached to the meter base 20.

All of the above-described structure may be of conventional form. The invention resides in the closure or cover for the box, which is indicated generally at 26 and comprises a rectangular metal sheet of suitable size and shape to fit upon the open front side of the box. A rearwardly disposed flange 27 is formed around the lower and side edges of the cover 26, for fitting over the edges of the side walls 12 and bottom 13 of the box.

An opening 28 is provided in the cover 26 to receive the meter case 25. This opening is slightly larger than the meter case and may be slightly elliptical, being elongated vertically, or may be substantially circular and of slightly larger diameter than the diameter of the meter case.

At the lower end of the cover 26, a rectangular aperture 29 is formed, to receive the latch keeper 30, which is welded or otherwise rigidly attached to the lower wall 13 of the box and extends forwardly therefrom, an angular flange 31 being formed upon the outer end thereof.

A latch bolt 32 is slidably mounted upon the outer surface of the cover 26, adjacent to the aperture 29. This latch bolt is slidably attached to the cover by means of a metal strip 33, welded or otherwise attached to the latch bolt 32, as indicated at 34, the ends of the strip 33 being inwardly offset, as indicated at 35, and located through the elongated slot 36 in the cover 26, and slidably engaging the inner side of the cover at opposite sides of the slot 36.

Projections 37 upon the outer side of the cover guide the latch bolt 32 as it is slidably moved upon the cover. An upturned flange 38 is formed along the lower edge of the latch bolt 32 for engagement under the flange 31 of the keeper 30 to latch the cover upon the box. The outer end of the latch bolt 32 is upturned as at 39 forming a finger grip by means of which the latch bolt may be operated.

Apertures 40 may be provided in the keeper 30 and in the upturned flange 38 upon the latch bolt, adapted to register with each other in the latched position, so that the usual seal may be attached by the power company for locking the cover upon the box.

For the purpose of grounding the meter in the event of line surges caused by lightning, surge clips indicated generally at 41 are provided. Each of these surge clips is formed of a single strip of metal, the upper end of which is bent outward and downward in U-shape as indicated at 42, the lower end being curved upwardly and inwardly as at 43, terminating in the flat terminal portion 44.

Two of these surge clips may be mounted in spaced relation upon the outer edge portion of each side wall 12. An aperture 45 is formed in each surge clip 41 to receive a projection 45' upon the side wall 12 to hold the clips in proper spaced relation so that the terminal portions 44 of the clips will contact the usual surge links 46 in the base 20 of the meter.

After the meter has been mounted in the box, with the terminal blades 19 thereof engaged in the terminal jaws 17 of the box, the cover 26 is placed upon the box by positioning the cover so that the outer end of the meter case 25 is received within the opening 28 in the cover, and the cover is moved through the position as shown in broken lines in Fig. 1, until it contacts the rubber gasket 47 upon the outer side of the meter base 20, as shown in full lines in Fig. 1.

At this point the upper edge of the opening 28 in the cover is located closely adjacent to the meter case 25, while the lower edge of the opening is spaced from the meter case. The cover is then slidably moved upward, locating the upper edge of the cover beneath the overhanging flange 15 at the top of the box.

At this point, as shown in Fig. 2, the lower edge of the opening 28 in the cover will be located closely adjacent to the meter case 25 while the upper edge of said opening will be spaced therefrom. It will be seen that the aperture 29 in the cover is sufficiently large to permit this sliding movement of the cover relative to the keeper 30.

To latch the cover in closed position upon the box, the latch bolt 32 is then slidably moved upon the cover, engaging the upturned flange 38, of the latch bolt under the angular flange 31 of the keeper 30, as shown in Fig. 2.

The portion of the cover surrounding the opening 26 will fit tightly upon the rubber gasket 47, thus providing a water-tight seal around the base of the meter. The usual sealing wire may then be placed through the apertures 40 in the keeper and the flange 38 of the latch bolt, and a lead seal placed thereon to lock the box in closed position.

When this seal is broken, the latch bolt 32 may be slidably moved to the position shown in Fig. 5 and the cover may then be slidably moved downward upon the box until the upper edge of the cover is disengaged from the overhanging flange 15 of the box. The cover may then be removed from the box without disturbing the meter connections.

In Fig. 7 is shown a slight modification of the invention. The box may be the same as shown in Figs. 1 to 6 and above described, and the same reference numerals are applied thereto. The cover, indicated generally at 26a, is formed of a rectangular sheet of metal having the rearwardly disposed flange 27a at its side and lower edges, and provided with the rectangular aperture 29a, similar to the aperture 29 above described, for receiving the keeper 30.

In this form of the invention the cover is provided with the outwardly offset annular flange 48 surrounding the opening 28a which may be of the same size and shape as the opening 28 above described. If desired, the rubber gasket upon the base 20 of the meter may be dispensed with, the outwardly offset annular flange 48 contacting the base of the meter to provide a water-tight seal. The cover 26a may be placed upon and removed from the box in the same manner as above described with reference to the cover 26.

From the above it will be obvious that a simple and easily operated ringless closure or cover is provided for socket type meter boxes, and which may be easily and readily placed upon or removed from the meter enclosure without disturbing the meter connections. This ringless cover provides a water-tight seal around the meter, thus dispensing with the customary sealing ring and the disadvantages thereof.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. In combination with a meter having a base with surge links on the rear side thereof and terminal posts projecting rearwardly from the base, a ringless socket type enclosure having a box-like body open at its front, terminal jaws in said enclosure for receiving said terminal posts of the meter, surge clips mounted upon the walls of the box-like body and having terminal portions projecting into the box for contact with the surge links of the meter, and a removable cover on the open front of the box having an opening therein through which the meter is located.

2. In combination with a meter having a base with surge links on the rear side thereof and terminal posts projecting rearwardly from the base, a ringless socket type enclosure having a box-like body open at its front, terminal jaws in said enclosure for receiving said terminal posts of the meter, surge clips having U-shape portions frictionally mounted upon the walls of the box-like body and having terminal portions projecting into the box for contact with the surge links of the meter, and a removable cover on the open front of the box having an opening therein through which the meter is located.

3. In combination with a meter having a base with surge links on the rear side thereof and terminal posts projecting rearwardly from the base, a ringless socket type closure having a box-like body open at its front, terminal jaws in said enclosure for receiving said terminal posts of the meter, surge clips mounted upon the walls of the box-like body and having curved spring portions terminating in flat terminal portions projecting into the box for contact with the surge links of the meter, and a removable cover on the open front of the box having an opening therein through which the meter is located.

4. In combination with a meter having a case and a base of larger diameter than the case with surge links on the rear side of the base and terminal posts projecting rearwardly from the base, a ringless socket type enclosure comprising a box open at its front, terminal jaws in the box for receiving said terminal posts of the meter, surge clips mounted upon the inner side walls of the box at the open front thereof and having angular terminal portions projecting into the box for contact with the surge links on the meter, and a removable cover on the open front of the box and having an opening of less diameter than the meter base, the meter case being located through said opening, the cover being disposed upon the front side of the meter base.

5. In combination with a meter having a case and a base of larger diameter than the case with surge links on the rear side of the base and terminal posts projecting rearwardly from the base, a ringless socket type enclosure comprising a box open at its front, terminal jaws in the box for receiving said terminal posts of the meter, surge clips mounted upon the inner side walls of the box at the open front thereof and having inwardly and forwardly disposed portions terminating in inwardly disposed angular terminal portions projecting into the box for contact with the surge links on the meter, and a removable cover on the open front of the box and having an opening of less diameter than the meter base, the meter case being located through said opening, the cover being disposed upon the front side of the meter base.

6. In combination with a meter having a case and a base of larger diameter than the case with surge links on the rear side of the base and terminal posts projecting rearwardly from the base, a ringless socket type enclosure comprising a box open at its front, terminal jaws in the box for receiving said terminal posts of the meter, surge clips mounted upon the inner side walls of the box at the open front thereof and having curved spring portions terminating in flat terminal portions projecting into the box for contact with the surge links on the meter, and a removable cover on the open front of the box and having an opening of less diameter than the meter base, the meter case being located through said opening, the cover being disposed upon the front side of the meter base.

References Cited in the file of this patent

UNITED STATES PATENTS

| 1,690,174 | Newman | Nov. 6, 1928 |
| 2,199,630 | Hodnette | May 7, 1940 |
| 2,338,109 | Green | Jan. 4, 1944 |
| 2,367,433 | Road | Jan. 16, 1945 |
| 2,429,093 | Johansson | Oct. 14, 1947 |